UNITED STATES PATENT OFFICE.

GUSTAV MÜNCH, OF GRIESHEIM, GERMANY, ASSIGNOR TO CHEMISCHE FABRIK GRIESHEIM-ELEKTRON, OF FRANKFORT-ON-THE-MAIN, GERMANY.

MANUFACTURE OF ZINC-SODIUM HYDROSULFITE.

1,068,522.   Specification of Letters Patent.   Patented July 29, 1913.

No Drawing.   Application filed October 4, 1911.   Serial No. 652,819.

*To all whom it may concern:*

Be it known that I, GUSTAV MÜNCH, a subject of the German Emperor, and resident of Griesheim o. M., Germany, have invented certain new and useful Improvements in the Manufacture of Zinc-Sodium Hydrosulfite, of which the following is a specification.

This invention consists in the production from zinc hydrosulfite and sodium hydrosulfite of the double salt zinc-sodium hydrosulfite.

Double salts of zinc sodium hydrosulfite have already been described in chemical literature, but the mode of preparation is quite different from the process in accordance with this invention. For instance solutions of sodium hydrosulfites and solutions of zinc chlorid have been mixed together, or lyes of zinc hydrosulfite have been salted out with common salt. Another well known process consists in the preparation of a difficultly soluble zinc hydrosulfite, but this process is quite different from that forming the object of the present invention, as in accordance with the said known process sulfites are treated, in the presence of water, with zinc dust and acid.

I have found that it is possible to manufacture by a simple process a zinc-sodium hydrosulfite, which is difficultly soluble and has a high percentage purity.

According to this invention solutions of crude zinc hydrosulfite and sodium hydrosulfite are mixed together, and in a short time a white crystalline salt separates out, which becomes thicker and thicker until the white mass assumes the consistency of thick pulp. The reaction takes place more rapidly if from the first the mixture be heated to, and maintained at, a temperature of from 60° to 65° centigrade. The yield of the salt from the aqueous mother lye is almost equal to the theoretical yield. It is the double salt zinc-sodium hydrosulfite with a small amount of impurities (thiosulfate, sulfite and sulfate). The precipitated salt can be separated from the mother-lye by means of acqueous alcohol and then dried *in vacuo* by heating up to form 60° to 70° centigrade.

It might have been anticipated that, in accordance with the data of Bazlen *Berichte* 38, 1905, I. p. 1060, a readily soluble double salt having the formula $ZnNa_2(S_2O_4)_2$ would be obtained, but this is not the case, as a difficultly soluble product is precipitated which contains one molecule of sodium hydrosulfite for about two molecules of zinc hydrosulfite. If more hydrosulfite be used, the excess remains in solution.

The process can be carried out as follows, but the invention is not limited to the precise details of the following example: 100 liters of zinc hydrosulfite lye containing 74 kilograms of $ZnS_2O_4$ and 150 liters of sodium hydrosulfite lye containing 33 kilograms of $Na_2S_2O_4$ are allowed to run together into a stirring vessel in which from the first the temperature is maintained at from 60° to 65° centigrade and at this temperature the stirring of the charge is continued for about half an hour and the hot liquor is then filtered. After the salt obtained has been washed with aqueous alcohol it is dried *in vacuo* at from 60° to 70° centigrade and a very good yield of a white stable double salt is obtained, containing about 90 per cent. of $ZnS_2O_4$. It can remain exposed to air for weeks without being seriously affected.

I claim:

1. The herein described process of producing a stable, high percentage and difficultly soluble zinc-sodium-hydrosulfite comprising stirring together solutions of zinc-hydrosulfite and sodium-hydrosulfite, while in a heated condition, and then separating the precipitated salt from the mother liquor.

2. The herein described process of producing a stable, high percentage and difficultly soluble zinc-sodium-hydrosulfite comprising stirring together solutions of zinc-hydrosulfite and sodium-hydrosulfite in the proportions of about two molecules of the zinc salt to 1 of the sodium salt, while in a heated condition, and then separating the precipitated salt from the mother liquor.

3. The herein described process of producing a stable, high percentage and difficultly soluble zinc-sodium hydrosulfite which comprises stirring together solutions of zinc hydrosulfite and sodium hydrosulfite in the proportions of about two molecules of the zinc salt to one of the sodium salt at a temperature of about 60 to 65° C. until precipitation of the difficultly soluble compound has taken place, and then separating such compound from the mother liquor.

In testimony whereof I have signed my name to this specification in the presence of two subscribing witnesses.

GUSTAV MÜNCH.

Witnesses:
 FRANZ HASSLACHER,
 ERWIN DIPPEL.